(12) United States Patent
Lundsjo et al.

(10) Patent No.: US 7,440,763 B2
(45) Date of Patent: Oct. 21, 2008

(54) MULTI-ACCESS CALL SETUP

(75) Inventors: Johan Lundsjo, Spånga (SE); Ramon Espineira, Kungsbacka (SE); Joakim Bergström, Stockholm (SE); Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 115 days.

(21) Appl. No.: 10/547,781

(22) PCT Filed: Apr. 11, 2003

(86) PCT No.: PCT/SE03/00594

§ 371 (c)(1),
(2), (4) Date: Sep. 6, 2005

(87) PCT Pub. No.: WO2004/091246

PCT Pub. Date: Oct. 21, 2004

(65) Prior Publication Data

US 2006/0189331 A1    Aug. 24, 2006

(51) Int. Cl.
*H04Q 7/20*    (2006.01)
(52) U.S. Cl. .................. 455/458; 455/445; 455/435.1; 455/435.2; 455/437; 455/439; 455/452.2; 455/456.2
(58) Field of Classification Search .......... 370/331, 370/338, 329; 455/435, 453, 426.1, 542.1, 455/458, 445, 435.2, 435.1, 437, 439, 452.2, 455/456.2
See application file for complete search history.

(56) References Cited

U.S. PATENT DOCUMENTS

| 6,628,942 | B1 * | 9/2003 | Beming et al. ........... 455/432.1 |
| 7,009,952 | B1 * | 3/2006 | Razavilar et al. ............ 370/331 |
| 2002/0085516 | A1 * | 7/2002 | Bridgelall ................... 370/329 |
| 2002/0090975 | A1 |  7/2002 | Laiho et al. |

(Continued)

FOREIGN PATENT DOCUMENTS

WO    WO 01/33892    5/2001

(Continued)

OTHER PUBLICATIONS

International Search Report mailed Oct. 22, 2003 in corresponding PCT Application No. PCT/SE2003/000594 (3 pages).

(Continued)

*Primary Examiner*—David Q Nguyen
(74) *Attorney, Agent, or Firm*—Nixon & Vanderhye, P.C.

(57) ABSTRACT

In a multi-access communication system, a terminal is kept reachable through a first access network, which is most resource efficient one of the available access networks for keeping the terminal reachable. The terminal scans passively for the existence of usable base stations for other access networks of the system and reports data associated with such existences to the first access network. When a request for a call to the terminal is received, a paging is performed in the first access network. The paging message comprises information about preferred access network, based on the reported data of the existence of usable base stations or access points of other access networks. The terminal connects to the preferred access network and performs a call set-up directly in the preferred access network.

16 Claims, 6 Drawing Sheets

U.S. PATENT DOCUMENTS

| | | |
|---|---|---|
| 2002/0147008 A1 | 10/2002 | Kallio |
| 2002/0160785 A1 | 10/2002 | Ovesjo et al. |
| 2003/0134638 A1* | 7/2003 | Sundar et al. ............... 455/435 |
| 2004/0037255 A1* | 2/2004 | Joong et al. ................. 370/338 |
| 2004/0146021 A1* | 7/2004 | Fors et al. ................... 370/331 |
| 2004/0203873 A1* | 10/2004 | Gray ....................... 455/456.1 |

FOREIGN PATENT DOCUMENTS

| | | |
|---|---|---|
| WO | WO 01/50804 | 7/2001 |
| WO | WO 02/45443 | 6/2002 |
| WO | WO 02/056625 | 7/2002 |

OTHER PUBLICATIONS

International Preliminary Report on Patentability dated Jun. 22, 2005 in corresponding PCT Application No. PCT/SE2003/000594 (3 pages).

* cited by examiner

MULTI-ACCESS CALL SETUP

This application is the U.S. national phase of International PCT Application No. PCT/SE2003/000594, filed Apr. 11, 2003, which designated the United States, the entire contents of which is herein incorporated by reference.

TECHNICAL FIELD

The present invention relates in general to multi-access communication systems and in particular to mobile terminated call set-up in such systems.

BACKGROUND

During the evolution of mobile communication systems, different radio access techniques have developed. In recent years one has realized the benefits of being able to utilize parallel systems by one and the same mobile terminal. Therefore, solutions of connecting networks of different access technologies have been developed to allow a user to switch between the different accesses.

Mobile communication systems that include multiple radio access networks employing different radio access technologies are throughout the present disclosure denoted multi-access communication systems. It is assumed that a user may move between different access networks using different access technologies, and the user should at all times be connected to the access network that is considered the "best" one, defined by certain criteria.

Some types of applications require that another party can reach the user, e.g. a telephony application, a video telephony application or an instant messaging application, where the user should be able to receive incoming calls. These applications will put some specific demands on the multi-access system. First of all a mechanism is needed for determining in which access network(s) the user can be found. Secondly, staying reachable within an access network costs resources; battery for the user, and capacity for the access network.

The possibility to make use of multiple access technologies and to be able to choose the best one depending on current needs, environment etc. is currently a hot topic that has been discussed in various publications. The focus in most published material on multi-access communication systems is on how to maintain and move sessions when switching between different access types. Typical examples of such handover and mobility publications are the published US patent applications US2002/0147008 A1 and US2002/0160785 A1.

In order to save battery of the user equipment, it is possible to let the user equipment be reachable by only one access network at a time, even if other access networks are present. In many multi-access communication systems, the user equipment is accessed through this only access network even if another technology would be better suited to handle the call. A set-up procedure has to be run before a switch to a better access technology can be performed. The disadvantage with such an approach is that a significant delay is caused before the best suited access technology can be used.

A set-up procedure e.g. in a cellular access network would at least have to include paging from the network, a reply from the terminal on a random access channel, and some signaling between the two for establishment of communication channels to carry the call and further signaling. Only after these steps, it will be possible to perform the signaling needed to switch to another access type. Detailed procedures differ between cellular technologies but the main principle is the same.

In the published US patent application US2002/0090975 A1, a multi-access communication system comprising two cellular access networks, UMTS and GSM, is disclosed. Since both access networks are coordinated by the same MSC, the MSC has inherent information about the coverage of the two access networks. When a request for a call or other type of communication session is received, a paging is performed in one of the access networks. If the requested communication session is of such a kind that the other access network would be better to handle it, the paging includes a request for switching access network. The set-up of the call is made directly in the most suitable access network. This ensures that the call will not be rejected as a consequence of being set-up over an access network that cannot support the call. The request for switching access network is based on the inherent knowledge about the coverage of the two coordinated access networks.

A problem with many conventional multi-access communication systems is that the resource efficiency for keeping a terminal reachable in more than one access network simultaneously is generally poor. Another problem with the conventional multi-access communication systems is that the time delay for performing a call set-up in any preferred access network generally is too long.

SUMMARY

A problem with many prior art multi-access communication systems is that the resource efficiency for keeping a terminal reachable in more than one access network simultaneously is generally poor. Another problem with prior-art multi-access communication systems is that the time delay for performing a call set-up in any preferred access network generally is too long.

An object of one more embodiments of the present disclosure is therefore to provide a multi-access communication system providing for a fast, resource-efficient call set-up in any reachable access network.

The above object is achieved by methods and devices according to one or more of the disclosure examples. In general in words, a terminal is kept reachable through a first access network, which is the most resource efficient one of the available access networks for keeping the terminal reachable. The terminal scans passively for the existence of usable base stations for other access networks of the system and reports data associated with such existences to the first access network. The passive scanning is resource efficient and is performed continuously or intermittent, either according to predetermined schemes or according to instructions from the first access network. When a request for a call to the terminal is received, a paging is performed in the first access network. The paging message comprises information about preferred access network, based on the reported data of the existence of usable base stations or access points of other access networks. The terminal connects to the preferred access network and performs a call set-up directly in the preferred access network.

One advantage with one or more of the example embodiments is that the resource efficiency for keeping a terminal reachable is kept at a minimum by utilizing the most efficient choice of access network. Another advantage is that a call set-up to the terminal, can be performed at a preferred access network without any unnecessary delays. A further advantage is a reduction in signaling during the inactivity periods as well as during the actual call set-up procedure.

BRIEF DESCRIPTION OF THE DRAWINGS

The invention, together with further objects and advantages thereof, may best be understood by making reference to the following description taken together with the accompanying drawings, in which.

DETAILED DESCRIPTION

One or more embodiments are based on three main bases. The first is the solution of rendering the reachability more resource effective by performing the reachability for all access networks through only one of them—the most resource effective one. The second basis is to make information about the availability of other access networks available through the single associated connection. The terminal thereby performs a passive scanning of any base stations for other access networks and reports the results. The third basis is the idea of using the neighboring access network information to request an access network change already in the paging phase of a call set-up.

For facilitating the discussions, a model multi-access communication system is used. It should, however, be noted that the scope of the patent protection should not be limited thereto, since this model system only serves as an example.

Figure 1:
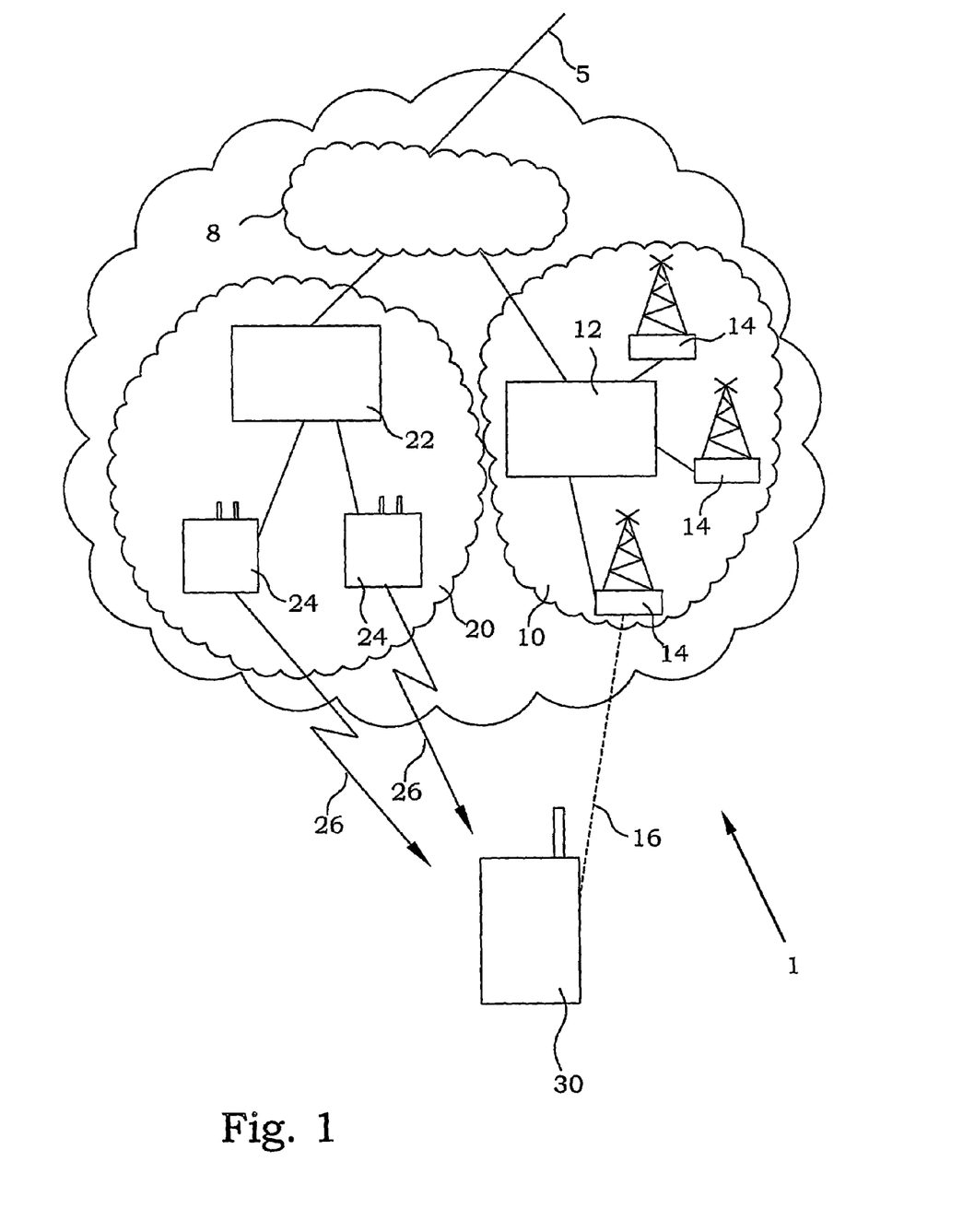
FIG. 1 is a block scheme of an embodiment of a multi-access communication system according to the present invention.

The model multi-access communication system 1 is schematically illustrated in FIG. 1. The model multi-access communication system 1 comprises two radio access networks; a WCDMA access network 10 and a WLAN access network 20. The access networks 10, 20 are interconnected by re-routing means 8, handling the relation there between. Besides this re-routing means 8, the two access networks 10, 20 need not be coordinated, i.e. regarding coverage area, resources etc. The re-routing means 8 is connected to external communication systems by a connection 5.

The WCDMA access network 10 comprises a number of base stations 14 (of which only three are illustrated). Each base station 14 is associated with at least one cell. The base stations 14 are connected by different types of control devices 12, through which the base stations 14 communicate with the re-routing means 8.

The WLAN access network 20 comprises a number of access points (AP) 24, interconnected by control devices 22, through which the APs 24 are in contact with the re-routing means 8.

The description of the actual access networks is sparse to highlight pertinent few aspects of one or more embodiments.

A terminal 30, supporting communication both through the WLAN 20 and the WCDMA 10 access network is present within the area covered by the WCDMA access network 10. During inactivity periods the terminal 30 is associated with a cell of a base station 14 of the WCDMA access network 10. This is indicated by the broken line 16. The terminal 30 monitors the cellular network by monitoring its paging channel.

The APs 24 of the WLAN access network 20 emit beacon signals 26, preferably comprising an identifier of the WLAN network. One possibility is to use Service Set IDentity (SSID). The terminal 30 need not be associated to the WLAN 20 but is able to detect the SSID and a signal strength of the beacon 26 carrying it. The WLAN 20 can be without knowledge about the presence of the terminal 30, while the terminal 30 can have knowledge about the presence of the WLAN 20.

Figures 2A, 2B:
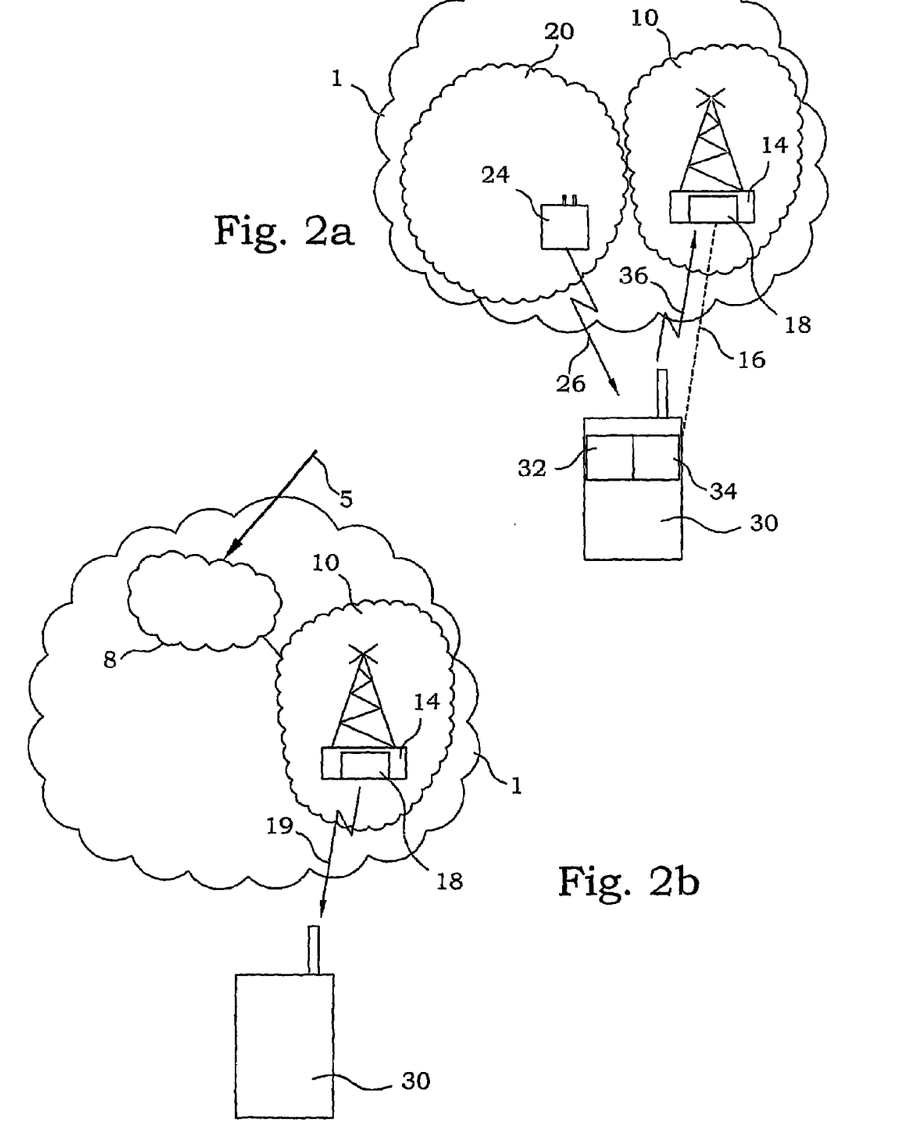
FIG. 2a is a block scheme of a multi-access communication system according to FIG. 1 in a stand-by mode.
FIG. 2b is a block scheme of a multi-access communication system according to FIG. 1 during a paging procedure.

A situation where the terminal 30 is associated with the WCDMA network 10 but only listens to the WLAN network 20 is illustrated in FIG. 2a. As described above, the WLAN AP 24 transmits a beacon signal 26 comprising e.g. the SSID. The terminal 30 has a passive scanner 32, which performs an intermittent scanning of beacons. The passive scanner 32 is arranged to read the SSID of the beacon signal 26. Furthermore, the passive scanner 32 is arranged to sense the signal strength of the beacon signal 26. A reporting means 34 is connected to the passive scanner 32 and forms an alternative access network reporting message 36 to the base station 14 of the WCDMA network 10 based on the results obtained by the passive scanner 32. The alternative access network reporting message 36 is transferred to the base station 14 and comprises preferably data concerning the SSID as well as the signal strength. The base station 14 receives the alternative access network reporting message in a paging data means 18. The data is evaluated and the present occurrence of any alternative access network is stored.

The reporting from the terminal 30 to the paging data means 18 can be performed continuously or intermittent, e.g. when any significant status changes occur. The paging data means 18 has thus updated information about the present terminal 30 situation. The terminal 30 is reachable through the WCDMA network 10, which is resource efficient concerning the task of keeping terminals reachable. The WLAN network 20 is so far unaware of the existence of the terminal 30. As discussed further below, a call establishment time may be significantly reduced if the terminal 30 continuously or periodically scans for WLAN 20 cells passively, even if it is only registered in the cellular network 10 and not associated with any WLAN AP 24.

Cellular standards include mechanisms for reaching the user that are very efficient in terms of conserving terminal battery, radio resources and network resources. Paging is a fundamental feature that minimizes the time that the terminal needs to monitor the network in order to be able to receive traffic. In addition, paging eliminates the need for the terminal to update the network at every cell change even at periods of no activity. This makes it possible for a cellular terminal to stay reachable for days before the battery needs to be re-charged. In addition, the paging mechanism in a cellular system is designed for fast and upper bounded response times.

However, for e.g. WLAN (Wideband Local Area Network) technology, only rudimentary support for mobility exists. There are no specific resource efficient mechanisms for users to stay reachable at all times without the need to actively communicate when moving between different cells. In order to stay reachable, the terminal has to initiate a re-association procedure, including some signaling between the terminal and the WLAN access point (AP), each time it moves to a new WLAN cell.

As some access technologies are more resource demanding than others are, it is a resource efficient strategy to stay reachable through the most suitable access. A simple solution to the inefficiency problem of staying reachable in a WLAN system is therefore to instead stay reachable through cellular access only.

In FIG. 2b, an incoming call to the terminal 30 enters the communication system 1 through the external connection 5. Since the WCDMA network 10 is the access network used for keeping the terminal 30 reachable, a paging procedure is started in the WCDMA network 10. A paging message is prepared, based on the properties of the incoming call as well as on the stored data concerning the present availability of alternative access networks. The call requirements, e.g. as high data rate as possible or a certain guaranteed QoS (Quality of Service), are matched to the stored data of available access networks. Since the terminal reports measurements on WLAN cells over the cellular access, the network has valuable information on whether the terminal is within WLAN coverage or not. In this way a preferred access network can be determined. Information about such a preferred access network is then preferably comprised in the paging massage, e.g. as an "access reselection indicator" information element or a paging cause value. The paging message 19 is transmitted and received by the terminal 30.

Figure 2C:
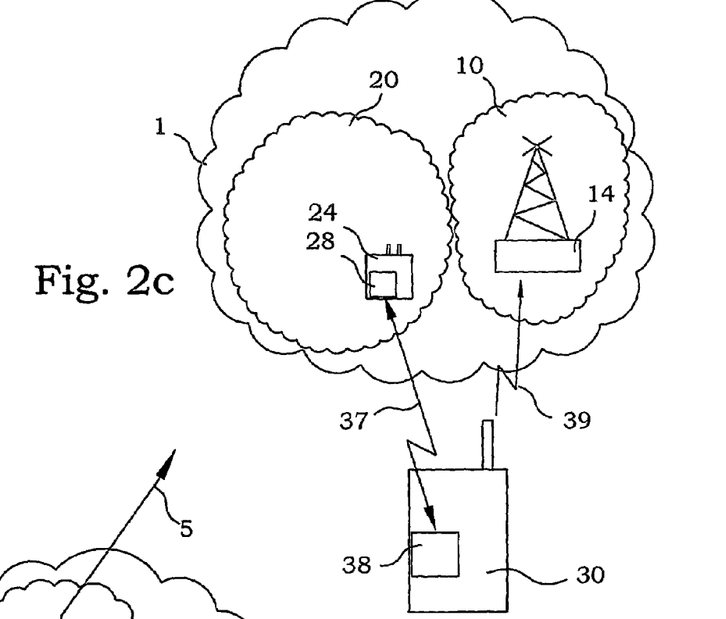
FIG. 2c is a block scheme of a multi-access communication system according to FIG. 1 during a call set-up procedure.

Upon reception of the paging message the terminal 30 is prepared to immediately start performing an association with the WLAN network 20. The terminal 30 has the results of previous passive scans available or it starts to search for suitable WLAN cells. Thereafter it can associate itself with a WLAN AP according to normal routines. This phase is illustrated in FIG. 2c. A call set-up means 28 in the WLAN AP 24 communicates by call set-up messages 37 with a WLAN call set-up means 38 of the terminal 30.

By indicating already in the paging message over the cellular access that the terminal should perform WLAN access, the cellular access set-up procedure can be avoided. Only the paging, i.e. the initiation of the procedure, is left from the set-up procedure whereas subsequent steps are eliminated. The procedure is facilitated e.g. by a specific paging cause value or a specific information element. The operator could e.g. set the paging cause value to "Perform WLAN access" when paging the terminal for an incoming call that best would be handled through WLAN. This is based on that the operator knows that the terminal is with in WLAN coverage area. Upon reception of the page message the terminal can immediately start searching for WLAN cells and associate itself with a WLAN AP. Thereby the call can be routed to the correct WLAN AP.

The terminal 30 may reply on the paging message, by a reception confirmation message 39. This reception confirmation message 39, as a reply on a "reselection" paging message, is an indication to the base station 14 that the paging message is received and that attempts to establish contact with another access network are in progress. If no contact can be established with the WLAN AP 24, the base station 14 should be informed, and the call should instead be received via WCDMA.

The terminal 30 may stay in idle mode in WCDMA even if the actual call is transferred to WLAN.

The passive scanning of alternative access networks is an advantageous ingredient in the example embodiment. The use of the principle of passive scanning of alternative access network beacons and reporting thereof through the access network in which the terminal is reachable reduces the overall call establishing time. Having the scanning results available prior to the reception of a page, the terminal is prepared to immediately associate itself with another access network. Moreover, since the scanning results also are communicated to the access network in which the terminal is reachable, even the page message can be adapted accordingly.

If the scanning is performed passively, i.e. without establishing a connection or association with any alternative access network base station, terminal battery as well as radio interface and network hardware resources of the alternative access network are still conserved. The passive scanning may be performed continuously, periodically and/or after an order/recommendation received over the first access network. The network may use terminal positioning information by means of e.g. GPS measurements in combination with a coverage map of alternative access networks in order to determine when terminals should be ordered/recommended to start scanning for beacons. Another alternative for the network to determine if the terminal is likely to be within alternative access network coverage is to use knowledge about alternative access network coverage in relation to the current area (cell or set of cells) the terminal will be paged over in the presently used access system.

As mentioned before, if the terminal reports measurements of alternative access network beacon signals over the present access, then the network will get more accurate information on whether the terminal is within alternative access network coverage in relation to the present access.

Figure 2D:
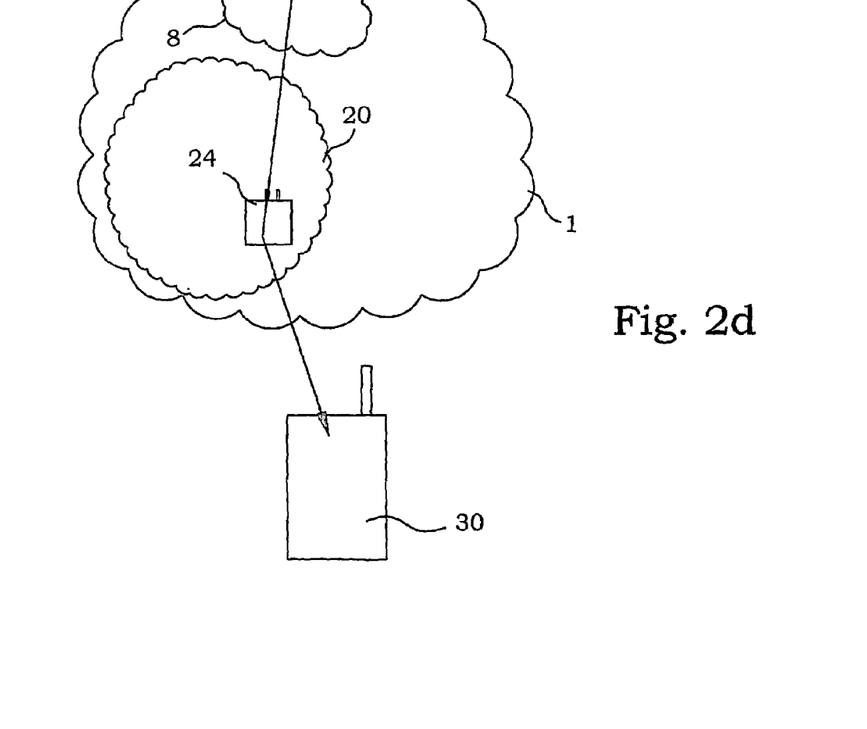
FIG. 2d is a block scheme of a multi-access communication system according to FIG. 1 during an ongoing call.

FIG. 2d illustrates the situation when the WLAN call set-up procedure is finished. The call is connected from the external connection 5 to the terminal 30 through the WLAN access network 20.

When the call is ended, the situation of FIG. 2a is preferably recovered. The terminal 30 disconnects from the WLAN access network.

Figure 4:
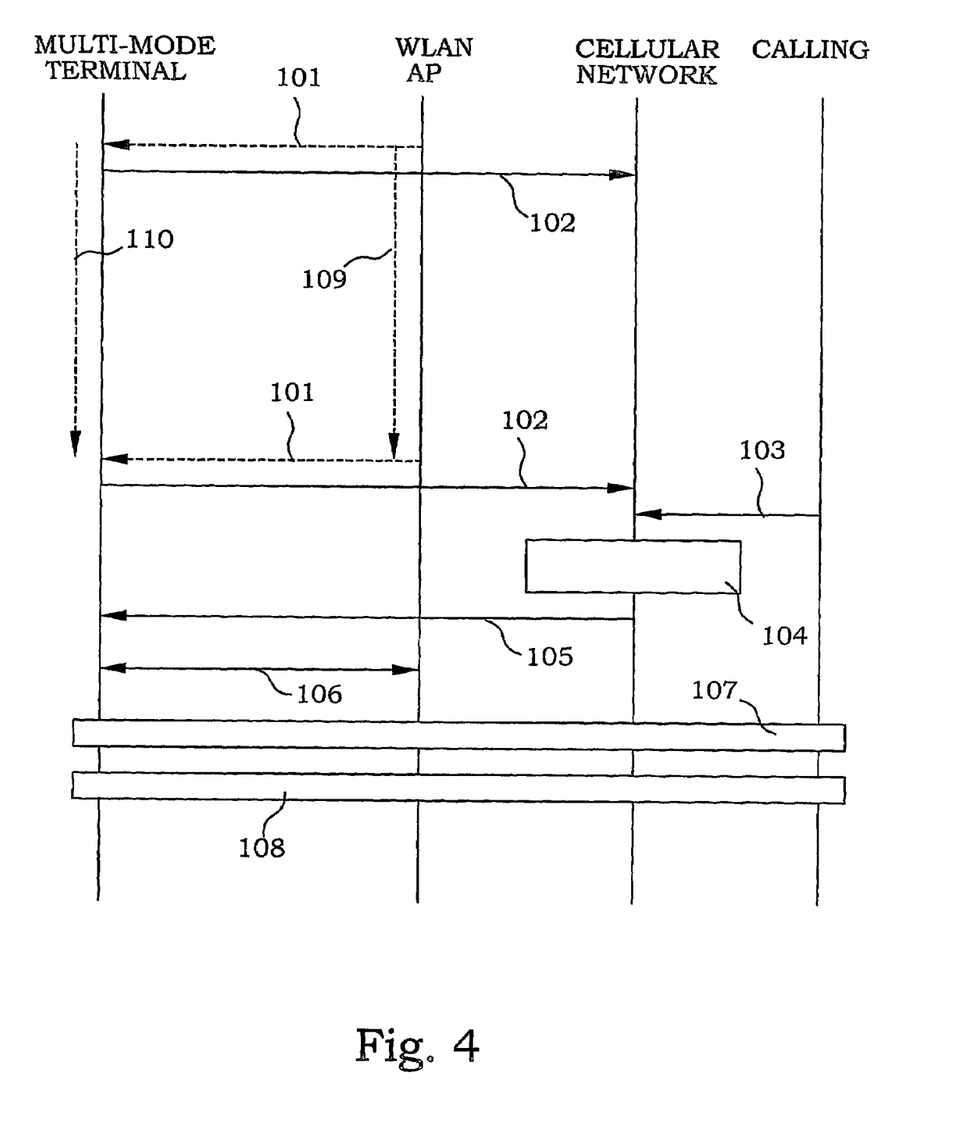
FIG. 4 is an embodiment of a call set-up sequence including scanning of WLAN beacons according to the present invention.

An example sequence illustrating a process having a cellular access network and a WLAN access network is shown in FIG. 4. The sequence starts by the terminal scanning WLAN beacons 101, being broadcast signals from the WLAN. These measured results are reported 102 over the cellular access. The measurement reports 102 could include the signal strengths of detected beacons and an identifier of the detected WLAN network. One possibility is to use the SSID that is carried by the WLAN beacon as identifier. The emission of beacon signals continues continuously or intermittently as indicated by an arrow 109. Also, the measurement at the terminal is performed continuously or intermittently as indicated by an arrow 110. The reports 102 are preferably transmitted upon changes. Next, the cellular network receives a request for an incoming call 103 from the calling party and determines that this call is well suited to be carried by WLAN. As the WCDMA access network recently has received a measurement report from the terminal indicating it is within WLAN coverage, the cellular network decides 104 to try to place incoming calls in WLAN. The cellular network pages 105 the terminal using a page cause value indicating that the terminal should attempt to access the WLAN. The terminal initiates an association procedure 106 with a WLAN AP, i.e. a connection between the terminal and the WLAN AP is established. The call is re-routed to the WLAN AP 107, e.g. through conventional methods like Mobile IP, to finish the call establishment. There is then an ongoing call over WLAN 108.

Figure 5:
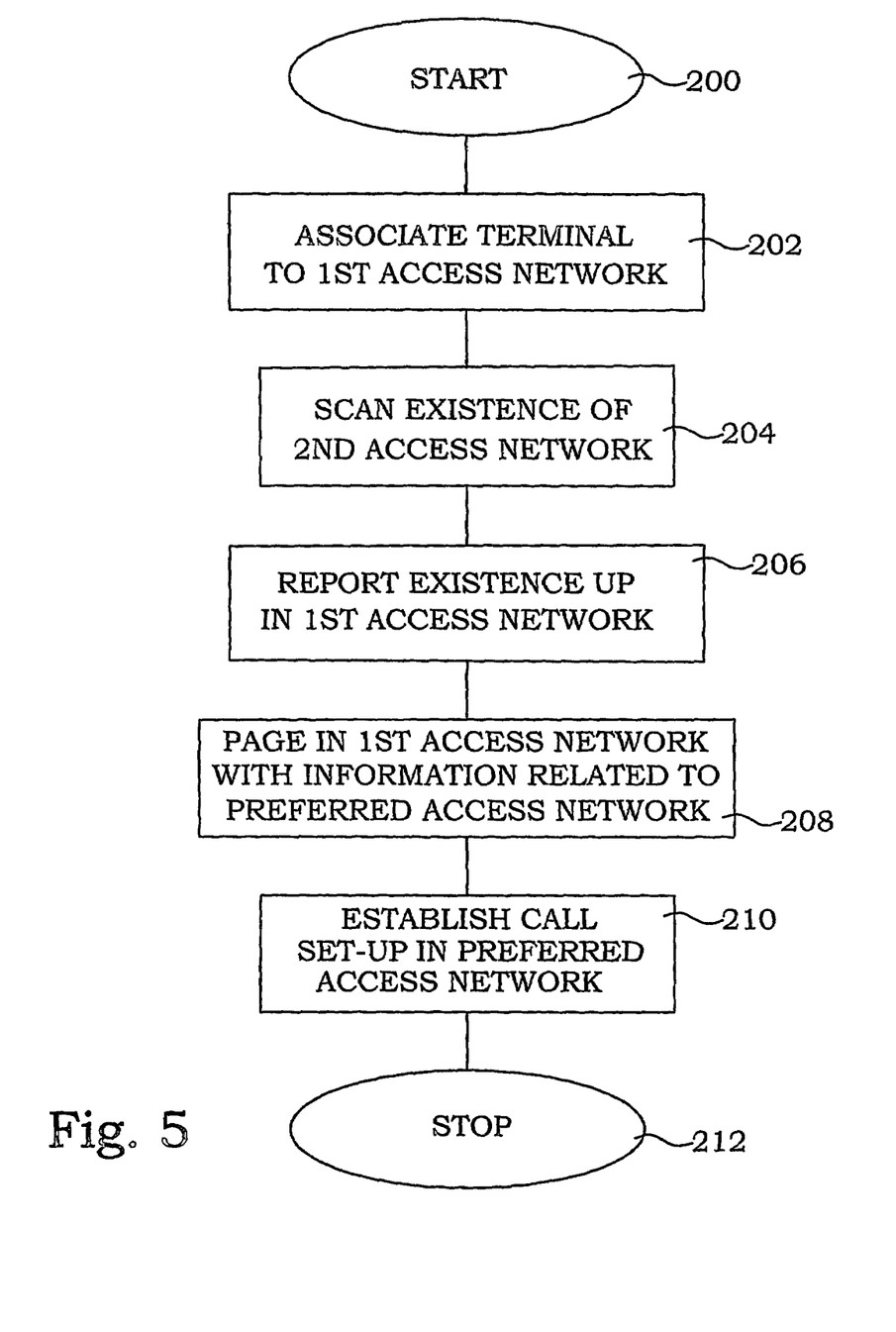
FIG. 5 is a flow diagram of an embodiment of a method according to the present invention.

Alternatively, the procedure can be expressed as a flow diagram, c.f. FIG. 5. The procedure starts in step 200. In step

202, the terminal is associated with a first access network, which is efficient in terms of resources concerning being reachable. In step 204, a passive scanning for existence of alternative access networks is preformed, preferably intermittently. In step 206, the results of the scanning is reported back in the first access network in the step 208. When an incoming call to the terminal comes, the terminal is paged in the first access network comprising information about preferred access network. In step 210, a call set-up is established according to the preferred access network information. The procedure ends in step 212.

Figures 3A, 3B:
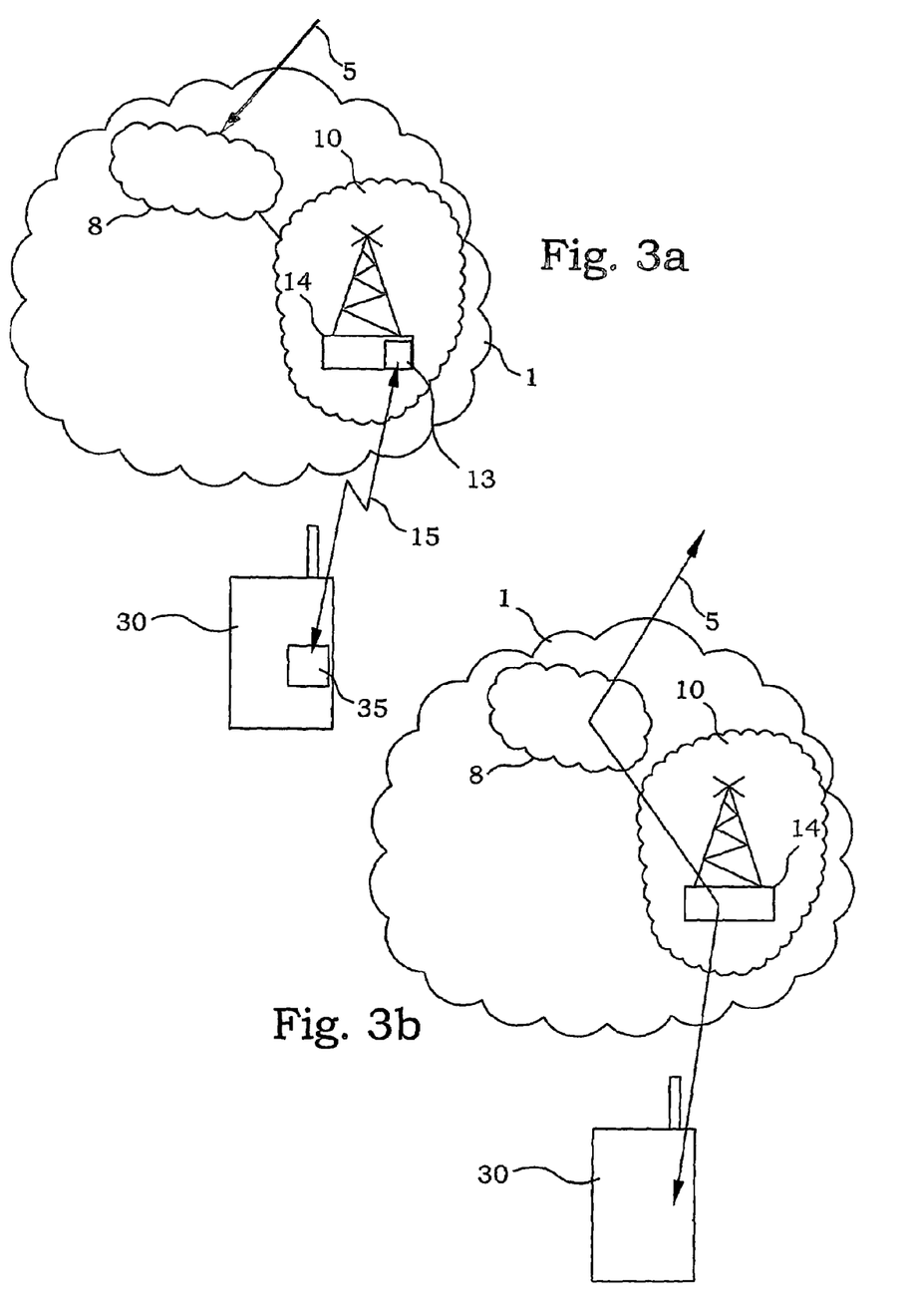
FIG. 3a is a block scheme of a multi-access communication system according to FIG. 1 during a WCDMA call set-up procedure.
FIG. 3b is a block scheme of a multi-access communication system according to FIG. 1 during an ongoing WCDMA call.

Now, consider a situation (c.f. FIG. 2a) where the passive scanning of the terminal 30 indicates that there is no alternative access network available, and this is reported to the WCDMA access network. When an incoming call occurs, the paging means treats the available information and comes to the conclusion that the preferred access network is the WCDMA. Similarly, if the incoming call has such preferences that the WCDMA access anyway is a better choice, WCDMA will be elected as preferred access network regardless if there is any WLAN available. Here, a paging message 19 associated to the incoming call is transmitted and the terminal 30 receives the paging message 19. However, this paging message does not contain any request for changing access network. The call is set-up by call set-up means 13 of the base station 14 and WCDMA call set-up means 35 in the terminal 30 via standard call set-up signaling 15. Such a situation is illustrated in FIG. 3a. The call is eventually, as indicated in FIG. 3b, connected from the external connection 5 to the terminal 30 via the WCDMA access network 10.

The example embodiments are is easily implementable into common cellular networks of today. For a WCDMA access network, paging for mobile terminated call setup is described in detail in standards. In particular for a user equipment in idle mode or RRC connected mode CELL_PCH or URA_PCH states, the action when receiving a paging message is well described in standards specifications. The message content is also well described. The main features are described here below.

When a UE is in idle mode or RRC connected mode in CELL_PCH or URA_PCH state, it listens to a paging control channel (PCCH), which carries paging messages. Associated with the paging channel is a paging indicator channel (PICH), which carries a short burst that informs the UE that there is information to read on the PCCH. For one particular UE, this burst is sent only at a certain time instant and at a certain periodicity called paging occasion. This allows the UE to turn off its radio receiver—"discontinuous reception"—during the time in between the paging occasions. This paging mechanism saves a large amount of battery power in the mobile terminal and substantially increases the battery life of a UE in "stand-by mode".

When the UE receives a paging message it decodes the message and looks for all paging records. Each paging record carries a specific UE identity and a paging cause value. Several paging records can be included in the same paging message in order to page several UEs with the same message. For each paging record, the UE compares the included UE identity with the identity of the UE itself. If there is a match, the UE reads the paging cause of that paging record and uses this cause to know why the UE was paged by the network. Examples of paging cause values are "Terminating conversational call", "Terminating streaming call", "Terminating background call", etc. representing the QoS class of the service that the network is trying to establish with the paging message.

The paging cause value is passed on to the upper layers in the UE. As a response to the paging indication with a cause value, the upper layers in the UE sends a paging response message/service request message. This message is sent back to the network and the core network node trying to establish the call.

If the UE is in RRC idle mode, i.e. not CELL_PCH or URA_PCH the response message to the core network node needs a signaling connection to be established before this message could be transported on the air interface and back to the core network node. This is done with the RRC connection setup procedure.

Some modifications to these standard procedures may be performed. The modification could be summarized as described below.

A new information element can be to be added to paging messages. This could be a new paging cause value or a separate information element. This information element could be an indicator saying e.g. "re-select to another access". It could alternatively be an indication of a particular access, e.g. "re-select to WLAN".

In the access information described above, a direct reference to a preferred access network is transferred by the paging message. Another possibility is to instead transfer other type of data, which can be processed by the UE in order to determine a preferred access network. One typical example would be to transfer a demand of quality of service (QoS) for the call to be established. Such a QoS demand can be comprised in a paging message. Based on that information, the UE is enabled to determine a preferred access network by utilizing knowledge about the characteristics of the different possible access network systems. Such knowledge is preferably stored within the UE in a storage means, and may comprise data e.g. specifying maximum data rate or allowed delay for each specific access network. The selected access network can then be utilized for further communication. A page response may also be transferred, either by the network that sent the paging message or by the newly selected network.

UE actions to be taken when receiving this new information element can be added to the standards specification of today. These actions can be such that the UE scan for alternative access systems. If an alternative access system is found, establish a connection to that alternative system and release the connection to the current access. Further, the UE remains associated with this new access system for the time T and waits for the incoming data related to the call that was initiated with the paging massage. The time T can be a separate parameter in the paging message or set to a value according to any specifications.

The concept of paging in GSM is very similar to that of WCDMA. The MS uses discontinuous reception to save battery power and listens to paging messages according to when these can be sent.

In GSM paging messages are sent on a paging sub-channel on PCCCH or CCCH. As in WCDMA, the paging message contains the mobile identity of the MS that is being paged. In addition, the paging message also contains "page mode" and "channel needed". These two information elements describes how the MS should act on the paging, and which channel the MS should use for the response message.

The solution has been described in the embodiments above for the combination of a WLAN access technology and a cellular radio access technology. The cellular radio access technology can be of essentially any kind, such as WCDMA, GSM, GSM/GPRS, or CDMA2000. However, also multi-access communication systems having access networks operating according to other technologies are possible to use according to the one or more of disclosed embodiments. For instance, WPAN (Wireless Personal Area Network) solutions are potentially also of great interest. The solution according to the example embodiments can be applied to a general case where a number of radio access technologies (not necessarily WLAN and/or cellular) are combined, and where these technologies differ in resource efficiency.

It will be understood by those skilled in the art that various modifications and changes may be made to the embodiments without departure from the scope thereof.

The invention claimed is:

1. A method for performing call-setup in a multi-access communication system, comprising:
   passively scanning, from a mobile terminal, an existence of usable base stations of a second access network, said second access network having a lower energy-resource efficiency for keeping a mobile terminal reachable than a first access network;
   reporting data associated with said existence of said usable base stations of said second access network from said mobile terminal to said first access network;
   receiving an incoming call for said mobile terminal from an external entity by said first network;
   paging said mobile terminal by said first access network after receiving the incoming call, said paging comprising access information based on the data reported from said mobile terminal, said access information enabling determination of a preferred access network among at least said first access network and said second access network to which said mobile terminal is connectable;
   establishing a call-setup according to said access information, wherein said access information comprises a demand of quality of service for the call to be setup; and
   determining said preferred access network based on said demand of quality of service and on pre-determined knowledge about characteristics of at least said first access network and said second access network.

2. A method according to claim 1, wherein said first access network is a cellular network and said second access network is a non-cellular network.

3. A method according to claim 2, wherein said second access network is selected from the group of: WLAN and WPAN.

4. A method according to claim 2, wherein said first access network is selected from the group of: GSM, GPRS, WCDMA, and CDMA2000.

5. A method according to claim 1, wherein said access information comprises a direct reference to said preferred access network.

6. A method according to claim 1, wherein said step of establishing a call-setup comprises associating said mobile terminal to said second access network as response to access information indicating said second access network being preferred, whereby said establishing step being performed directly with said second access network.

7. A method according to claim 1, wherein said step of passively scanning in turn comprises:
   identifying base stations transmitting beacon signals; and
   measuring a signal strength of said beacon signal.

8. A method according to claim 1, wherein said second access network is unaware of a presence of said mobile terminal when said step of reporting said data associated with said existence from said mobile terminal to said first access network is performed.

9. A method according to claim 1, further comprising:
   receiving an incoming call request from a caller to the mobile terminal via said first access network,
   wherein said steps of paging of the mobile terminal and establishing the call-setup are performed in response to receiving the incoming call request.

10. A mobile terminal connectable to a multi-access communication system, said mobile terminal being reachable through a first access network of said multi-access communication system, said mobile terminal comprising:
    means for passively scanning any existence of usable base stations of a second access network of said multi-access system, said second access network having a lower energy-resource efficiency for keeping said mobile terminal reachable than said first access network; and
    means for reporting data associated with said existence to said first access network, whereby said access information being based on said data associated with said existence;
    means for receiving a paging message from said first access network, said paging message being received after said first access network receives an incoming call for said mobile terminal from an external entity, said access information enabling determination of a preferred access network among at least said first access network and a second access network of said access communication system;
    means for establishing a call-setup according to said access information, wherein said access information comprises a demand of quality of service for the call to be setup; and
    means determining said preferred access network based on said demand of quality of service and on pre-determined knowledge about characteristics of at least said first access network and said second access network.

11. A mobile terminal according to claim 10, wherein said first access network is a cellular network and said second access network is a non-cellular network.

12. A mobile terminal according to claim 11, wherein said second access network is selected from the group of: WLAN and WPAN.

13. A mobile terminal according to claim 11, wherein said first access network is selected from the group of: GSM, GPRS, WCDMA, and CDMA2000.

14. A mobile terminal according to claim 10, wherein said access information comprises a demand of quality of service for the call to be setup, whereby said mobile terminal further comprises storage means for storage of data about characteristics of at least said first access network and said second access network and means for determining said preferred access network connected to said storage means and said means for receiving a paging message.

15. A mobile terminal according to claim 10, wherein said second access network is unaware of a presence of said mobile terminal when said means for reporting reports said data associated with said existence from said mobile terminal to said first access network is performed.

16. A mobile terminal according to claim 10, wherein said means for receiving the paging message receives the paging message from said first access network in response to said first access network receiving an incoming call request from a caller to the mobile terminal via said first access network.

* * * * *

UNITED STATES PATENT AND TRADEMARK OFFICE
CERTIFICATE OF CORRECTION

PATENT NO. : 7,440,763 B2  Page 1 of 1
APPLICATION NO. : 10/547781
DATED : October 21, 2008
INVENTOR(S) : Lundsjo et al.

It is certified that error appears in the above-identified patent and that said Letters Patent is hereby corrected as shown below:

In Column 2, Lines 19-25, delete "A problem with .................. network generally is too long." and insert -- A problem with the system disclosed in US2002/0090975 A1 is that it is limited to systems of two or more cellular access networks supported by a common control. --, therefor.

In Column 2, Line 29, delete "prior art" and insert -- conventional --, therefor.

In Column 2, Line 32, delete "prior-art" and insert -- the conventional --, therefor.

In Column 2, Line 37, delete "one" and insert -- one or --, therefor.

In Column 2, Line 42, delete "disclosure" and insert -- disclosed --, therefor.

In Column 2, Line 43, after "general" delete "in".

In Column 7, Line 32, after "are" delete "is".

In Column 8, Line 8, after "URA_PCH" insert -- , --.

Signed and Sealed this

Thirty-first Day of March, 2009

JOHN DOLL
*Acting Director of the United States Patent and Trademark Office*